April 16, 1963 P. T. HUTCHISON 3,086,203

COMMUNICATION SYSTEM USING POLARIZED WAVES AND EMPLOYING CONCENTRIC WAVEGUIDES TO CONTROL TRANSMITTER-RECEIVER INTERACTION

Filed March 7, 1961

INVENTOR.

P. T. HUTCHISON

BY E. W. Adams, Jr.

ATTORNEY

United States Patent Office 3,086,203

Patented Apr. 16, 1963

3,086,203

COMMUNICATION SYSTEM USING POLARIZED WAVES AND EMPLOYING CONCENTRIC WAVEGUIDES TO CONTROL TRANSMITTER-RECEIVER INTERACTION

Paul T. Hutchison, New Providence, N.J., assignor to Bell Telephone Laboratories, Incorporated, New York, N.Y., a corporation of New York Filed Mar. 7, 1961, Ser. No. 94,080
10 Claims. (Cl. 343—100)

Figures 1, 2:
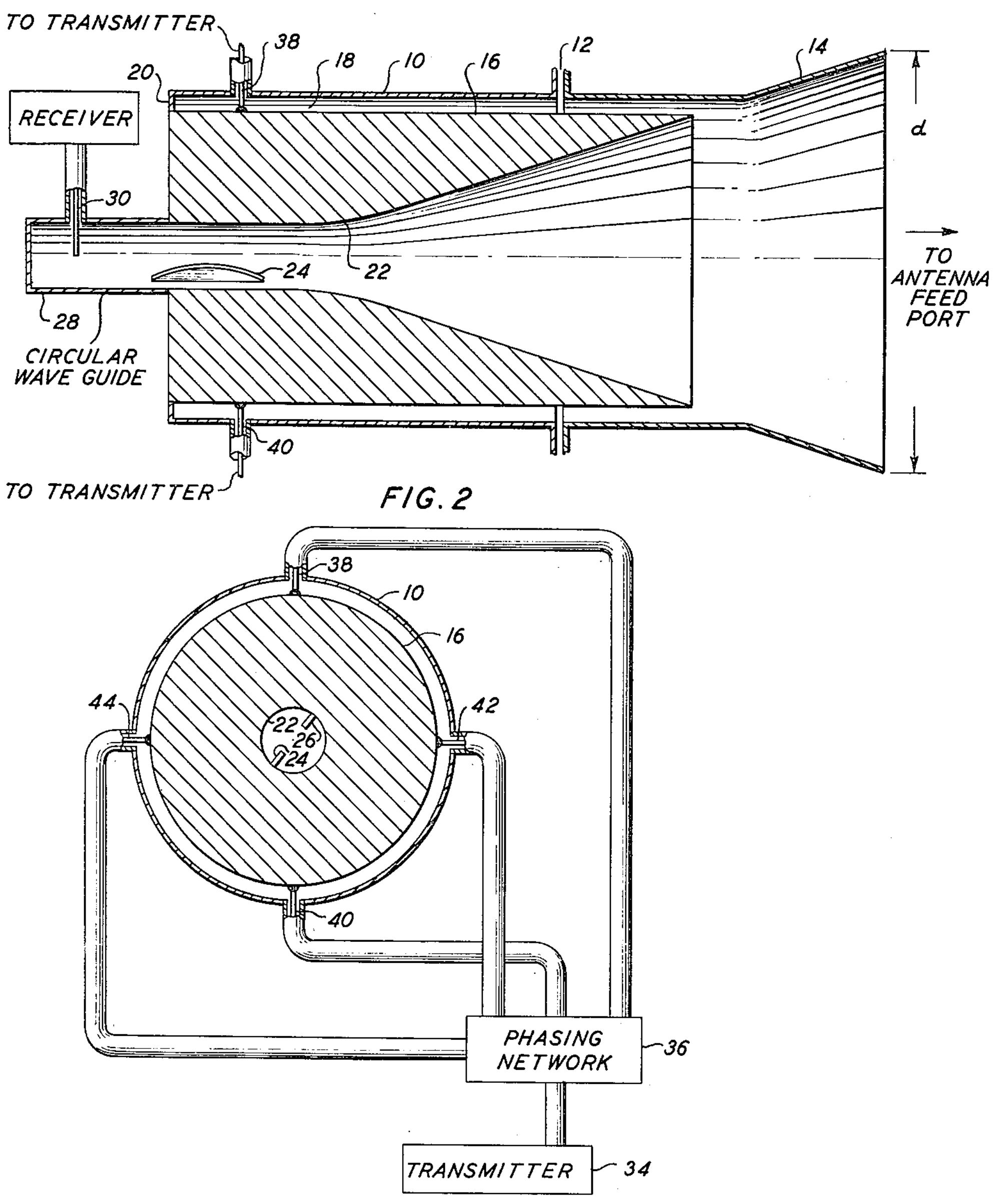

This invention relates to combining networks and more particularly to a waveguide network for interconnecting first, second, and third microwave transmission paths to provide transmission between the first, and the second and the third paths, respectively, without interference between the latter two paths.

The problem of interconnecting transmission paths to permit non-interfering and simultaneous transmission of communication or other signals between a first one of the paths and either of the other two paths has received considerable attention. Perhaps the most common instance of this problem is that encountered in radar systems wherein it is necessary to connect an antenna to both a transmitter and a receiver and at the same time to prevent damage to the receiver by the high power energy radiated from the transmitter. This particular problem has often been solved on a time division basis by the well-known TR and ATR devices. There are, however, many systems wherein the wide disparity in power level is not encountered but where it is still desirable to eliminate cross coupling between continuously and simultaneously operated transmitters and receivers associated with a common antenna. Combining networks for such applications have, in general, been limited to those wherein the signals to be combined or separated are linearly polarized in different planes of polarization. If circularly polarized waves are to be employed by either the transmitter or the receiver, conversion to linearly polarized waves is required prior to the combining or separating operation and reconversion may also be required thereafter.

It is accordingly the object of the present invention to improve the isolation performance of combining networks, particularly where wide frequency differences are involved, and at the same time to reduce the over-all dimensions and complexities of such networks to be used in microwave systems adapted for the transmission of waves of a wide variety of propagation modes.

In accordance with the above object, the combining network of the invention comprises a waveguide structure suitable for use in interconnecting first, second, and third transmission paths to permit transmission between the first path and either the second or the third path without interference. As arranged for use with circularly polarized waves of substantially different frequencies, this structure acts to separate the two waves while both are circularly polarized. The network comprises a circular waveguide which tapers from a first diameter to a larger diameter, as required, for connection to the first of the three paths. A core member is mounted coaxially within the first guide of diameter differing from that of the circular guide by a constant amount to form a coaxial region between the two and extends through less than the entire length thereof. A second circular waveguide traverses the core member and is concentric therewith. At the end of the second waveguide remote from the first transmission path the diameter of the guide is chosen, as required, by the signal energy to be connected to the second transmission path and the guide increases to a diameter at the end remote from the second transmission path equal to the diameter of the core member. The third transmission path is connected to the coaxial region by means suitable for the launching of a circularly polarized wave in that region.

The above and other features of the invention will be described in the following specification taken in connection with the drawing in which:

FIG. 1 is a front elevation in section, through the medial vertical plane, of a waveguide combining network according to the invention; and FIG. 2 is an end view partly in section of the combining network of FIG. 1.

The combining network of the invention is disclosed in the drawing as arranged for use at the terminal of a communication system wherein a receiver and a transmitter operating at frequencies differing by a factor of several times are associated with a common antenna capable of supporting circularly polarized signal energy over a sufficiently broad band of frequencies to include both the frequency assigned to the transmitter and that assigned to the receiver. As shown in FIG. 1, the network is arranged for application to the feed port of an antenna where the feed port has a diameter *d*. Where the antenna is the usual parabolic or Cassegrainian antenna the feed port may be taken as the exit aperture of the feed horn. In a horn-reflector antenna it may be taken as the throat of the horn reflector.

The combining network comprises an outer circular waveguide 10, shown in FIG. 1 as interrupted by a slot 12, the purpose of which will be considered hereinafter. Waveguide 10 is substantially cylindrical in form over a substantial portion of its length but tapers in a section 14 to provide a diameter increasing from that of the cylindrical section to the diameter *d* of the feed port of the antenna. Although waveguide 10 is shown as essentially cylindrical in section at the left side of FIG. 1, the taper may be substantially continuous and the invention is not limited to arrangements in which a cylindrical section is employed.

Mounted within circular waveguide 10 is a core member 16 made of conducting material and having a diameter which differs from that of waveguide 10 by a substantially constant amount throughout the length of the core member. As shown, the core member is shorter than waveguide 10 and is coextensive therewith only at the left end of the combining network (FIG. 1). It will be recognized that the cylindrical core member 16 and the circular waveguide 10 define a coaxial region 18 and this coaxial region is terminated at the end of waveguide 10 remote from the antenna feed port by a conducting partition 20.

Core member 16 is traversed by a coaxial circular opening to provide a second circular waveguide 22 extending coaxially of waveguide 10. Waveguide 22 is of diameter appropriate to the transmission of circularly polarized waves of the frequency chosen for operation of the receiver, which is connected through various transducers to the left end of the waveguide, and expands in diameter to a diameter equal to that of the core member at the end nearest to the feed port of the antenna. Preferably and as shown in FIG. 1 of the drawing, the taper of waveguide 22 forms a continuation of that of waveguide 10 so that a smooth essentially continuous curve joins the feed port of the antenna and the end of waveguide 22 to which the receiver is to be connected.

Circularly polarized waves from the antenna and of an appropriate frequency, as determined by the minimum diameter of waveguide 22, travel from the antenna toward the left end of waveguide 22. Here, they encounter a 90 degree section polarizer comprising a pair of conductive fins 24 and 26 shown oriented at an angle of 45 degrees to the vertical in the drawing. These fins convert the circularly polarized wave to a linearly polarized wave in the usual manner and such linearly polarized wave is abstracted from the combining network through an extension 28 of circular waveguide 22 and coupled therefrom by a vertically oriented coaxial probe 30 to a receiver 32. The orientation of the polarizer is obviously determined by the nature of the transducer associated with the particular receiver.

Lower frequency waves produced by a transmitter 34 (FIG. 2) are coupled by way of a phasing network 36 and probe-type transducers to the coaxial region 18, defined by core member 16 and circular waveguide 10. For this purpose, coaxial probes 38 and 40 are arranged in a pair and enter the coaxial space in the vertical plane including the axis of the combining network. A second pair of probes 42 and 44 enter the coaxial region in the horizontal plane including the axis of the network. It will be recognized that either pair of probes, if excited by signals in phase opposition, will serve to produce a $TE_{11}$-like wave in the coaxial region. The addition of the second pair of probes will serve to produce a second $TE_{11}$-like wave and the two together produce essentially a circularly polarized wave in the coaxial region.

Details of the phasing network 36 are conventional and it will be understood that the lengths of the lines joining probes 38 and 40, and 42 and 44, together with the internal circuitry of the phasing network are such as to provide excitation of the four probes at, respectively, a reference phase and at 90-degree, 180-degree, and 270-degree relative phase to produce the required excitation of an essentially circularly polarized wave. In accordance with usual practice, probes 38 through 44 enter the coaxial region a distance of approximately one-quarter wavelength from the short-circuited termination thereof at the frequency of the transmitter. The waves launched in this manner travel toward the antenna feed port in a section which, as the end of the core member is reached, is large enough to support only the $TE_{11}$ circular waveguide mode. Although the diameter of the outer waveguide increases from this point on to the feed port of the antenna, the taper is made sufficiently gradual so that a spherical phase front is established before the cone becomes large enough to support other transmission modes. Beyond this point there are no discontinuities which would act to establish transmission at other modes.

In addition to the isolation between transmitter and receiver signals afforded by the structure so far described, the lengths of the inner waveguide 22 and its cylindrical extension are made sufficient to provide additional isolation, this waveguide section being of sufficiently small diameter to be below cut-off to the low frequency from the transmitter.

It will be recalled that outer waveguide 10 is interrupted by a slot 12 and this arrangement is provided to permit the use of a rotating joint between the antenna structure and the combining network at this point. Electrical continuity is maintained by any well-known technique. It is pointed out, however, that the distance from the feed probes 38 through 44 to the rotating joint slot 12 should be at least one-half wavelength at the frequency of the transmitter.

In the operation of the network for the reception of signals, most of the received energy enters the inner waveguide 22 by way of the conical section 14 and ultimately reaches the receiver. A small part of the energy intercepted by the antenna does enter coaxial section 18. Most of this stray energy is reflected at the transmitter port which is a poor match at the higher receiver frequency. A small amount is dissipated in the resistive component of the transmitter port impedance and is lost as a noise power contribution. However, only a small part of this noise power finally finds its way into the receiver and produces but a small increase in system noise temperature.

Although the combining network of the invention finds particular utility in applications involving circularly polarized waves, it may also be employed where either the transmitted or received wave, or both, are linearly polarized if appropriate adjustments are made in the input and output transducers.

What is claimed is:

1. A microwave combining network for connecting a first microwave transmission path to second and third microwave transmission paths, respectively, without cross coupling between said second and third paths comprising a first circular waveguide having a diameter tapering from one appropriate to said second transmission path to one for connection to said first transmission path, a core of circular cross section concentric with said first waveguide and of diameter at every point along its length differing from and less than that of said first waveguide by a constant amount to provide a coaxial region between said first waveguide and said core throughout less than the entire length of said first waveguide, a waveguide concentric with said first waveguide and traversing said core, means for connecting said third transmission path to the end of said second waveguide remote from said first transmission path, said second waveguide increasing in diameter from that of said third path to that of said first waveguide at the end of the core adjacent said first path, and means for launching circularly polarized waves from said second path within said coaxial region.

2. A microwave combining network for connecting a first microwave transmission path to second and third microwave transmission paths, respectively, without cross coupling between said second and third paths comprising a first circular waveguide having a substantially cylindrical section and a tapered section connecting said cylindrical section of said first transmission path, the diameter of said tapered section increasing from that of the cylindrical section to that required for said first path, a cylindrical core concentric and coextensive with said cylindrical section and of diameter smaller than said cylindrical section to form a coaxial region with said cylindrical section, a second circular waveguide concentric with and traversing said core with a diameter increasing from that required for said second path to one substantially equal to that of said core at the end thereof adjacent the juncture of the two sections of said first waveguide, means connecting the other end of said second waveguide to said second path, and means connected to said third path for launching waves in said coaxial region.

3. A microwave combining network for connecting a first microwave transmission path to second and third microwave transmission paths, respectively, without cross coupling between said second and third paths comprising a first circular waveguide having substantially a cylindrical section and a tapered section connecting said cylindrical section of said first transmission path, the diameter of said tapered section increasing from that of the cylindrical section to that required for said first path, a cylindrical core concentric and coextensive with said cylindrical section and of diameter smaller than said cylindrical section to form a coaxial region with said cylindrical section, a second circular waveguide concentric with and traversing said core with a diameter increasing from that required for said second path to one substantially equal to that of said core at the end thereof adjacent the juncture of the two sections of said first waveguide, means connecting the other end of said second waveguide to said second path, means connected to said third path for launching waves in said coaxial region, means for launching circularly polarized waves from said third path in said coaxial region, and means for converting waves from said first path to circularly polarized waves for coupling to said second path.

4. A microwave combining network for connecting a first microwave transmission path to second and third microwave transmisison paths, respectively, without cross coupling between said second and third paths comprising a first circular waveguide having substantially a cylindrical section and a tapered section connecting said cylindrical section of said first transmission path, the diameter of said tapered section increasing from that of the cylindrical section to that required for said first path, a cylindrical core concentric and coextensive with said cylindrical section and of diameter smaller than said cylindrical section to form a coaxial region with said cylindrical section, a second circular waveguide concentric with and traversing said core with a diameter increasing from that required for said second path to one substantially equal to that of said core at the end thereof adjacent the juncture of the two sections of said first waveguide, means connecting the other end of said second waveguide to said second path, means connected to said third path for launching waves in said coaxial region, means for terminating the coaxial region at the end thereof remote from said first path, and means for launching circularly polarized waves from said third path in said coaxial region comprising two pairs of coaxial probes mounted orthogonally about the periphery of said first waveguide to extend into said coaxial region, and means for exciting said probes with phase differences of 90 degrees taken progressively about the circumference of said first waveguide.

5. A microwave combining network for connecting a first microwave transmission path to second and third microwave transmission paths, respectively, without cross coupling between said second and third paths comprising a first circular waveguide having substantially a cylindrical section and a tapered section connecting said cylindrical section of said first transmission path, the diameter of said tapered section increasing from that of the cylindrical section to that required for said first path, a cylindrical core concentric and coextensive with said cylindrical section and of diameter smaller than said cylindrical section to form a coaxial region with said cylindrical section, a second circular waveguide concentric with and traversing said core with a diameter increasing from that required for said second path to one substantially equal to that of said core at the end thereof adjacent the juncture of the two sections of said first waveguide, means connecting the other end of said waveguide to said second path, means connected to said third path for launching waves in said coaxial region, means connected to said third path for launching waves in the coaxial region between said core and said first waveguide, and means for converting waves from said first path to linearly polarized waves for coupling to said second path, said last-mentioned means comprising a pair of oppositely disposed fins mounted diametrically within the second waveguide adjacent the end thereof remote from said first path.

6. In a feed for interconnecting a broadband antenna and separate high frequency transmitters and receivers, a first section of circular waveguide of diameter appropriate to the feed port of the antenna, a second circular waveguide section concentric with the first and having a wall thickness tapering from that required to provide an inner diameter appropriate to the transmission of signals to the receiver to substantially zero thickness at the feed port of the antenna, means for launching a wave to be transmitted in the coaxial region defined by the first section and the outer surface of said second section, and means for converting waves entering said second waveguide section from said antenna to circularly polarized waves.

7. In a communication station, a transmitter, a receiver operating at different microwave frequencies, an antenna capable of operation over a band of frequencies, including that of said transmitter and that of said receiver, and a combining network for connecting said antenna to said transmitter and said receiver, respectively, without interconnecting said transmitter and said receiver comprising a first circular waveguide having a substantially cylindrical section and a tapered section connecting said first section and feed port of said antenna, a cylindrical core concentric and coextensive with said cylindrical section and of diameter smaller than said cylindrical section to form a coaxial region between said cylindrical section and said core, a second circular waveguide coupled to said receiver and traversing said core coaxially thereof with a diameter increasing from that required for coupling to said receiver to substantial equality to that of said core at the end adjacent the juncture of said waveguide sections, and means interconnecting said transmitting and said coaxial region for launching circularly polarized waves in said region from said transmitter.

8. In a communication station, a microwave transmitter operating at a first frequency, a microwave receiver operating at a frequency several times that of said transmitter, an antenna having a circular feed port and capable of accepting signals of both the transmitter and receiver frequencies, and a combining network interconnecting said antenna feed port and said transmitter and receiver, respectively, without substantial coupling between said transmitter and said receiver, said network comprising a first circular waveguide connected to said feed port and tapering in diameter from a first diameter to that of said feed port, a cylindrical core concentric with and coextensive with a portion of said first waveguide remote from said feed port and of diameter differing from that of said first waveguide by a constant to provide a coaxial region between said core and said waveguide, a second circular waveguide traversing said core coaxially and of a diameter increasing from that required for connection to said receiver to one substantially equal to that of said core at the end of the core nearest said feed port, and means for launching circularly polarized waves from said transmitter in said coaxial region for transmission to said feed port.

9. In a communication station, a microwave transmitter operating at a first frequency, a microwave receiver operating at a frequency several times that of said transmitter, an antenna having a circular feed port and capable of accepting signals of both the transmitter and receiver frequencies, and a combining network interconnecting said antenna feed port and said transmitter and receiver, respectively, without substantial coupling between said transmitter and said receiver, said network comprising a first circular waveguide connected to said feed port and tapering in diameter from a first diameter to that of said feed port, a cylindrical core concentric with and coextensive with a portion of said first waveguide remote from said feed port and of diameter differing from that of said first waveguide by a constant to provide a coaxial region between said core and said waveguide, a second circular waveguide traversing said core coaxially and of a diameter increasing from that required for connection to said receiver to one substantially equal to that of said core at the end of the core nearest said feed port, and means for launching circularly polarized waves from said transmitter in said coaxial region for transmission to said feed port, the diameter of said second waveguide being below cut-off at the frequency of said transmitter and the length of said waveguide exceeding the diameter of said first waveguide by several times to reject signals of transmitter frequency at the input of said receiver.

10. A microwave combining network for connecting a first microwave transmission path to second and third microwave transmission paths, respectively, without cross coupling between said second and third paths comprising a first circular waveguide having a diameter tapering from one appropriate to said second transmission path to one for connection to said first transmission path, a core of circular cross section concentric with said first waveguide and of diameter at every point along its length differing from and less than that of said first waveguide by a constant amount to provide a coaxial region between said first waveguide and said core throughout less than the entire length of said first waveguide, a waveguide concentric with said first waveguide and traversing said core, means for connecting said third transmission path to the end of said second waveguide remote from said first transmission path, said second waveguide increasing in diameter from that of said third path to that of said first waveguide at the end of the core adjacent said first path, and means for launching circularly polarized waves from said second path within said coaxial region, said first waveguide being interrupted in a plane normal to the axis thereof to permit rotation of the end of said first waveguide relative to the remainder thereof, the plane of said interruption intersecting said first waveguide in the portion thereof overlying said coaxial region.

No references cited.